United States Patent
Bhat et al.

(10) Patent No.: US 11,551,209 B2
(45) Date of Patent: *Jan. 10, 2023

(54) FINANCIAL ACCOUNT AUTHENTICATION

(71) Applicant: Yodlee, Inc., Redwood City, CA (US)

(72) Inventors: Dheeraj Bhat, Sunnyvale, CA (US); Sachinraj Shetty, Bangalore (IN); Venkata Naga Saran Kumar Makam, Bangalore (IN)

(73) Assignee: Yodlee, Inc., San Mateo, CA (US)

( * ) Notice: Subject to any disclaimer, the term of this patent is extended or adjusted under 35 U.S.C. 154(b) by 400 days.

This patent is subject to a terminal disclaimer.

(21) Appl. No.: 16/656,195

(22) Filed: Oct. 17, 2019

(65) Prior Publication Data
US 2020/0051163 A1 Feb. 13, 2020

Related U.S. Application Data

(63) Continuation of application No. 13/934,173, filed on Jul. 2, 2013, now Pat. No. 10,489,852.

(51) Int. Cl.
*G06Q 20/38* (2012.01)
*G06Q 40/00* (2012.01)
(Continued)

(52) U.S. Cl.
CPC ......... *G06Q 20/3829* (2013.01); *G06F 9/451* (2018.02); *G06F 21/57* (2013.01);
(Continued)

(58) Field of Classification Search
None
See application file for complete search history.

(56) References Cited

U.S. PATENT DOCUMENTS 5,883,810 A * 3/1999 Franklin ............... G06Q 30/06
700/232
6,327,578 B1 * 12/2001 Linehan ............... G06Q 20/04
705/65

(Continued)

OTHER PUBLICATIONS

Nam et al (On the Efficient PKI System with SSO for Multi-IDs Server Service for the International Conference on Control, Automation and Systems 2007 (ICCAS 2007)) (Year: 2007).*

(Continued)

*Primary Examiner* — Mamon Obeid
(74) *Attorney, Agent, or Firm* — Fish & Richardson P.C.

(57) ABSTRACT

Methods, systems, and apparatus, including computer programs encoded on computer storage media, for receiving, from a user device, a request to include financial data describing a financial account in an interface, the financial account being associated with a particular financial institution; identifying one or more metadata attributes for accessing the financial account associated with the particular financial institution; obtaining a public digital key associated with the financial institution; providing, to the user device, data describing the one or more metadata attributes and the public digital key associated with the financial institution; receiving, from the user device, respective values for the one or more metadata attributes, the corresponding values having been encrypted by the user device using the public digital key; and storing the encrypted values for the one or more metadata attributes for use in accessing and aggregating financial data describing the financial account.

20 Claims, 4 Drawing Sheets

(51) Int. Cl.
*G06F 9/451* (2018.01)
*G06F 21/57* (2013.01)
*G06Q 20/10* (2012.01)
*G06Q 30/06* (2012.01)
*G06Q 40/02* (2012.01)

(52) U.S. Cl.
CPC ....... *G06Q 20/108* (2013.01); *G06Q 30/0601* (2013.01); *G06Q 40/00* (2013.01); *G06Q 40/02* (2013.01)

(56) References Cited

U.S. PATENT DOCUMENTS

| | | | | |
|---|---|---|---|---|
| 6,484,182 | B1* | 11/2002 | Dunphy | G06Q 30/0201 705/7.29 |
| 6,567,783 | B1* | 5/2003 | Notani | G06Q 10/06 705/7.26 |
| 6,961,858 | B2* | 11/2005 | Fransdonk | G06F 21/10 705/52 |
| 7,020,635 | B2* | 3/2006 | Hamilton | G06Q 30/06 705/52 |
| 7,080,049 | B2* | 7/2006 | Truitt | G06Q 40/02 705/75 |
| 7,090,128 | B2* | 8/2006 | Farley | H04L 67/565 705/57 |
| 7,107,462 | B2* | 9/2006 | Fransdonk | G06Q 20/123 380/282 |
| 7,120,928 | B2 | 10/2006 | Sheth et al. | |
| 7,150,045 | B2* | 12/2006 | Koelle | H04L 63/145 713/193 |
| 7,266,684 | B2 | 9/2007 | Jancula et al. | |
| 7,292,999 | B2* | 11/2007 | Hobson | G06Q 20/02 705/64 |
| 7,370,011 | B2* | 5/2008 | Bennett | G06Q 20/10 705/35 |
| 7,383,231 | B2* | 6/2008 | Gupta | G06Q 20/085 705/64 |
| 7,502,760 | B1* | 3/2009 | Gupta | G06Q 20/367 705/64 |
| 7,565,538 | B2* | 7/2009 | Gray | H04L 9/3297 713/153 |
| 7,587,502 | B2* | 9/2009 | Crawford | A63F 13/77 709/227 |
| 7,680,735 | B1* | 3/2010 | Loy | G06Q 20/102 705/40 |
| 7,711,586 | B2* | 5/2010 | Aggarwal | G06Q 30/0283 705/5 |
| 7,720,864 | B1* | 5/2010 | Muth | G06F 16/128 709/228 |
| 7,729,995 | B1* | 6/2010 | Alain | G06F 21/6227 705/64 |
| 7,743,979 | B2* | 6/2010 | Fredman | G06Q 20/10 235/379 |
| 7,766,244 | B1* | 8/2010 | Field | G06Q 20/357 235/487 |
| 7,818,309 | B2* | 10/2010 | Browne | G06F 16/24552 707/705 |
| 8,042,163 | B1* | 10/2011 | Karr | G06F 3/062 726/8 |
| 8,234,336 | B2* | 7/2012 | Slater | H04L 65/403 726/8 |
| 8,335,745 | B2* | 12/2012 | Perlman | G06Q 20/3821 705/67 |
| 8,433,657 | B2 | 4/2013 | Dinan | |
| 8,438,622 | B2* | 5/2013 | Cynkin | G06F 21/6218 713/172 |
| 8,473,397 | B2 | 6/2013 | Gardner et al. | |
| 8,528,078 | B2* | 9/2013 | Camaisa | H04L 63/0838 713/168 |
| 8,639,629 | B1* | 1/2014 | Hoffman | G06Q 20/3821 705/64 |
| 8,838,501 | B1* | 9/2014 | Priebatsch | G06Q 20/3821 705/64 |
| 8,856,887 | B2* | 10/2014 | Field-Eliot | H04L 63/08 713/172 |
| 9,065,817 | B2* | 6/2015 | Bailey | H04L 63/08 |
| 9,076,182 | B2* | 7/2015 | Chourasia | G06Q 40/12 |
| 9,251,240 | B2* | 2/2016 | Wu | G06F 21/6209 |
| 9,288,210 | B2* | 3/2016 | Bono | H04L 63/101 |
| 9,419,841 | B1* | 8/2016 | Kozolchyk | H04L 67/1097 |
| 9,537,857 | B1* | 1/2017 | Koved | H04L 63/06 |
| 9,565,212 | B2* | 2/2017 | Faltyn | H04W 12/06 |
| 9,589,298 | B2* | 3/2017 | Pant | G06Q 40/02 |
| 9,602,508 | B1* | 3/2017 | Mahaffey | H04L 63/10 |
| 9,774,587 | B2* | 9/2017 | Kumar | H04L 63/08 |
| 9,779,345 | B2* | 10/2017 | Gaddam | H04N 1/32117 |
| 9,824,351 | B2* | 11/2017 | Pruthi | H04L 63/08 |
| 9,824,353 | B2* | 11/2017 | Li | H04W 12/0433 |
| 9,846,878 | B2* | 12/2017 | Kumnick | G06Q 20/3674 |
| 10,133,861 | B2* | 11/2018 | Guionneau | H04L 9/3263 |
| 10,223,692 | B2* | 3/2019 | Jeon | G06Q 20/363 |
| 10,289,835 | B1* | 5/2019 | Machani | H04L 63/0428 |
| 10,356,053 | B1* | 7/2019 | Zubovsky | H04L 63/0428 |
| 10,489,852 | B2* | 11/2019 | Bhat | G06Q 40/00 |
| 2001/0037300 | A1* | 11/2001 | Miyazaki | G07F 19/211 705/43 |
| 2002/0049655 | A1* | 4/2002 | Bennett | G07F 19/20 705/35 |
| 2002/0133467 | A1* | 9/2002 | Hobson | G06Q 20/04 705/64 |
| 2003/0028470 | A1* | 2/2003 | Dutta | G06Q 30/06 705/26.1 |
| 2003/0028481 | A1* | 2/2003 | Flitcroft | G07F 19/00 705/39 |
| 2003/0061170 | A1* | 3/2003 | Uzo | G06Q 20/367 705/64 |
| 2003/0200202 | A1* | 10/2003 | Hsiao | G06F 21/6218 |
| 2003/0204460 | A1* | 10/2003 | Robinson | G07F 7/1016 705/35 |
| 2004/0059682 | A1* | 3/2004 | Hasumi | G06Q 20/385 705/64 |
| 2004/0162997 | A1* | 8/2004 | Hopmann | H04L 63/104 713/154 |
| 2005/0102188 | A1* | 5/2005 | Hutchison | G06Q 20/10 705/26.1 |
| 2005/0119978 | A1* | 6/2005 | Ates | G06Q 20/04 705/67 |
| 2005/0154643 | A1* | 7/2005 | Doan | G06Q 30/0601 705/26.1 |
| 2005/0166263 | A1* | 7/2005 | Nanopoulos | H04L 9/3228 726/7 |
| 2005/0192896 | A1* | 9/2005 | Hutchison | G06Q 20/401 705/40 |
| 2006/0174322 | A1* | 8/2006 | Turner | H04L 9/3263 726/3 |
| 2006/0235795 | A1* | 10/2006 | Johnson | G06Q 20/40 705/44 |
| 2006/0235796 | A1* | 10/2006 | Johnson | G06Q 20/02 705/44 |
| 2008/0015927 | A1* | 1/2008 | Ramirez | G06Q 30/02 705/7.41 |
| 2008/0031447 | A1* | 2/2008 | Geshwind | H04L 9/0822 713/168 |
| 2008/0133413 | A1* | 6/2008 | Bennett | G07F 19/20 726/2 |
| 2008/0147562 | A1* | 6/2008 | Allen | G06Q 40/02 705/64 |
| 2008/0178009 | A1* | 7/2008 | Funahashi | H04L 9/3231 713/186 |
| 2008/0178258 | A1* | 7/2008 | Loomis | G06Q 20/401 726/2 |
| 2008/0223918 | A1* | 9/2008 | Williams | G06Q 20/342 235/379 |
| 2009/0089215 | A1* | 4/2009 | Newton | G06Q 20/3821 705/76 |
| 2009/0192940 | A1* | 7/2009 | Mann, III | G06Q 20/4012 705/44 |
| 2010/0031041 | A1* | 2/2010 | Cohen | H04L 9/3263 713/168 |

(56) References Cited

U.S. PATENT DOCUMENTS

| | | | |
|---|---|---|---|
| 2010/0083358 A1* | 4/2010 | Govindarajan | H04L 63/08 726/6 |
| 2010/0088237 A1* | 4/2010 | Wankmueller | G06Q 30/0601 705/75 |
| 2010/0088519 A1* | 4/2010 | Tsuruoka | H04L 9/3273 713/176 |
| 2010/0100952 A1* | 4/2010 | Sample | H04L 67/565 726/9 |
| 2010/0138316 A1* | 6/2010 | Connors | G06F 9/451 715/752 |
| 2010/0257085 A1* | 10/2010 | Bowne | G06Q 40/00 713/170 |
| 2011/0087592 A1* | 4/2011 | van der Veen | G06Q 20/227 705/44 |
| 2011/0161498 A1* | 6/2011 | Guntupalli | G07F 19/20 709/227 |
| 2011/0314288 A1* | 12/2011 | Yogev | H04L 9/3273 713/172 |
| 2012/0259782 A1* | 10/2012 | Hammad | G06Q 20/382 705/44 |
| 2012/0317036 A1* | 12/2012 | Bower | G06Q 20/02 705/75 |
| 2012/0324242 A1* | 12/2012 | Kirsch | G06F 21/6245 713/189 |
| 2012/0330843 A1* | 12/2012 | Von Mueller | G06K 7/082 705/64 |
| 2013/0036454 A1* | 2/2013 | Purvis | G06F 21/6218 726/4 |
| 2013/0074167 A1* | 3/2013 | Bailey | G06F 21/41 726/8 |
| 2013/0085944 A1* | 4/2013 | Fielder | H04L 9/0869 705/67 |
| 2013/0145447 A1* | 6/2013 | Maron | G06F 21/31 726/6 |
| 2013/0227661 A1* | 8/2013 | Gupta | H04L 9/321 726/6 |
| 2013/0263212 A1* | 10/2013 | Faltyn | H04L 63/20 726/1 |
| 2013/0283361 A1* | 10/2013 | Rao | H04L 9/3236 726/7 |
| 2013/0339473 A1* | 12/2013 | McCaffrey | H04L 67/535 709/216 |
| 2014/0067674 A1* | 3/2014 | Leyva | G06Q 20/3274 705/44 |
| 2014/0067675 A1* | 3/2014 | Leyva | G06Q 20/38215 705/44 |
| 2014/0074637 A1* | 3/2014 | Hammad | G06Q 20/351 705/21 |
| 2014/0157394 A1* | 6/2014 | Koonjbearry | H04L 63/0823 726/10 |
| 2014/0164243 A1* | 6/2014 | Aabye | G06Q 20/3821 705/44 |
| 2014/0189352 A1* | 7/2014 | Baskaran | G06F 21/6218 713/168 |
| 2014/0189808 A1* | 7/2014 | Mahaffey | H04L 63/083 726/4 |
| 2014/0222668 A1* | 8/2014 | Wall | G06Q 20/12 705/39 |
| 2014/0223516 A1* | 8/2014 | Vongsouvanh | H04L 63/0815 726/4 |
| 2014/0223573 A1* | 8/2014 | Reedy | H04L 63/0428 726/26 |
| 2014/0236792 A1* | 8/2014 | Pant | G06Q 40/00 705/35 |
| 2014/0283023 A1* | 9/2014 | Flavin | G06F 21/45 726/21 |
| 2014/0337230 A1* | 11/2014 | Bacastow | G06Q 20/12 705/44 |
| 2014/0351126 A1* | 11/2014 | Priebatsch | G06Q 20/40 705/44 |
| 2015/0012443 A1* | 1/2015 | Bhat | G06F 9/451 705/50 |
| 2015/0074408 A1* | 3/2015 | Oberheide | H04L 9/083 713/171 |
| 2015/0134519 A1* | 5/2015 | Wankmueller | G06Q 20/351 705/41 |
| 2015/0199689 A1* | 7/2015 | Kumnick | G06Q 20/4016 705/67 |
| 2015/0262161 A1* | 9/2015 | McMullan | G06Q 20/385 705/39 |
| 2015/0269566 A1* | 9/2015 | Gaddam | G06Q 20/385 705/67 |
| 2015/0278550 A1* | 10/2015 | Lin | H04L 63/0428 713/153 |
| 2015/0363775 A1* | 12/2015 | Li | H04L 9/321 705/71 |
| 2016/0021691 A1* | 1/2016 | Lee | H04W 12/06 455/435.1 |
| 2016/0028550 A1* | 1/2016 | Gaddam | H04L 9/3215 713/173 |
| 2016/0127454 A1* | 5/2016 | Maheshwari | H04L 41/0803 709/223 |
| 2016/0140335 A1* | 5/2016 | Proulx | H04L 63/083 726/6 |
| 2016/0148197 A1* | 5/2016 | Dimmick | G06Q 20/425 705/67 |
| 2016/0203475 A1* | 7/2016 | Venugopalan | G06Q 20/3672 705/66 |
| 2016/0267467 A1* | 9/2016 | Rutherford | G06Q 20/341 |
| 2016/0321653 A1* | 11/2016 | Jacobs | G06Q 20/367 |
| 2016/0350747 A1* | 12/2016 | Pruthi | H04L 63/061 |
| 2016/0350748 A1* | 12/2016 | Pruthi | H04L 63/061 |
| 2016/0350751 A1* | 12/2016 | Keys | G06F 21/6245 |
| 2017/0141926 A1* | 5/2017 | Xu | H04L 9/3066 |
| 2017/0257215 A1* | 9/2017 | Huang | H04L 63/083 |
| 2017/0323299 A1* | 11/2017 | Davis | G06Q 20/204 |
| 2018/0005228 A1* | 1/2018 | Anderson | G06Q 20/26 |
| 2018/0025342 A1* | 1/2018 | Shauh | G06Q 20/38 705/44 |
| 2018/0039615 A1* | 2/2018 | Trivedi | G06F 16/957 |
| 2018/0075247 A1* | 3/2018 | Campero | H04L 63/0853 |
| 2018/0075455 A1* | 3/2018 | Kumnick | G06Q 20/4016 |
| 2018/0150836 A1* | 5/2018 | Kumar | G06Q 20/38215 |
| 2018/0247294 A1* | 8/2018 | Shauh | G06Q 20/3226 |

OTHER PUBLICATIONS

CA Office Action in Canadian Application No. 2917190, dated Jun. 30, 2020, 4 pages.
IN Office Action in Indian Application No. 201627003244, dated Jul. 7, 2020, 7 pages.
Al Sinani et al (Integrating OAuth with Information Card Systems), 2011 (Year: 2011).
International Search Report and Written Opinion of International Patent Application No. PCT/US2014/045033, filed Jul. 1, 2014, 11 pages.
International Preliminary Report on Patentability for International Patent Application No. PCT/US2014/045033, filed Jul. 1, 2014, 8 pages.
Communication Pursuant to Article 94(3) EPC received for European Patent Application No. 14 819 705,6, filed Jan. 21, 2016, 5 pages.
Extended European Search Report received for European Patent Application No. 14 819 705.6, filed Jan. 21, 2016, 4 pages.
AU Office Action received in Australian Application No. 2020202508, dated May 11, 2021, 4 Pages.
CA Office Action in Canadian Application No. 2917190, dated Apr. 21, 2020, 3 pages.

* cited by examiner

FINANCIAL ACCOUNT AUTHENTICATION

CROSS-REFERENCE TO RELATED APPLICATIONS

This application is a continuation application of and claims priority to U.S. application Ser. No. 13/934,173, filed on Jul. 2, 2013.

TECHNICAL FIELD

This specification relates to authenticating user accounts for account aggregation.

BACKGROUND

As the Internet has grown in popularity, more users are turning to services provided over the Internet to help manage their finances. These services can be provided by financial institutions, such as banks or credit card companies, or by account aggregators who aggregate and present user-specific financial information from one or more financial institutions. Users typically use a user name and password to log-in to webpage(s) maintained by a financial institution or an account aggregator. From the webpage(s), the user can access online banking, electronic bill payment, account aggregation, and other online financial services. Online banking provides a user access to the user's financial information and also offers a number of services to a user. Users can, for example, view their statements online, including transaction details and cancelled checks, transfer balances online, and apply for loans online.

Users can also use electronic bill payment to pay bills online by transferring money from an account to a creditor through the Internet. Many financial institutions allow a user to pay all of the user's bills from their webpage(s). Users can also schedule payments to creditors from some financial institution webpages. Users can also authorize automatic payments to satisfy periodic financial obligations. A payment is made automatically when, for example, a biller charges a user account or debits a user account without direct user input (other than an initial authorization to make automatic payments). Account aggregation involves presenting financial information related to one or more accounts of a user in one place. Each account can be with a different financial institution. Account aggregation makes it easy for a user to quickly get a summary of his or her overall finances.

SUMMARY

This specification describes technologies relating to authenticating user accounts for financial account aggregation. Financial account aggregation generally requires storing, in an aggregation server system, user login credentials for user financial accounts with various financial institutions. Using stored user login credentials, the aggregation server system can access and aggregate user financial data from respective financial accounts, for example, through a financial institution website. However, storing user login credentials in an aggregation server system can potentially risk user financial data security in the event the aggregation server system is compromised.

Thus, in some implementations, a public-key infrastructure (PKI) configuration is used to protect user login information. In such implementations, each financial institution generates a public key and a private key using an algorithm, e.g., RSA. Depending on the implementation, financial institutions can provide their respective public keys to the aggregation server system or can make their public keys available on a publicly accessible server. The aggregation server system can provide public keys for financial institutions to a user device for use in encrypting user login information. For example, a user interacting with the user device can provide plaintext login information for a particular financial institution to the user device and, in response, the user device can use the particular financial institution's public key to encrypt the user's login credentials. The user device provides the encrypted login information to the aggregation server system, which stores the encrypted user login information for use in accessing and aggregating a user's financial data from the particular financial institution. In contrast, each financial institution stores its respective private key in secret. Data that is encrypted using a financial institution's public key can only be decrypted using that financial institution's private key.

As used in this specification, user login information can include the user's login credentials in addition to other types of information that may be needed for the user to login. For example, the user login information can include data for satisfying multi-factor authentication (MFA) requirements that have been implemented by a financial institution (e.g., a mapping of the user's answers to challenge questions).

When aggregating the user's financial data from the particular financial institution, the aggregation server system provides the user's encrypted login information to the particular financial institution. The particular financial institution uses its private key to decrypt the user's encrypted login information and to authenticate the aggregation server system. If authentication is successful, the aggregation server system gains access and aggregates the user's financial data. In such implementations, each financial institution has its own pair of public and private keys. Thus, for each financial institution on which a user has a financial account, the aggregation server system stores the user's respective login information for that financial institution.

In general, one aspect of the subject matter described in this specification can be embodied in methods that include the actions of receiving, from a user device, a request to include financial data describing a financial account in an interface, the financial account being associated with a particular financial institution; identifying one or more metadata attributes for accessing the financial account associated with the particular financial institution; obtaining a public digital key associated with the financial institution; providing, to the user device, data describing the one or more metadata attributes and the public digital key associated with the financial institution; receiving, from the user device, respective values for the one or more metadata attributes, the corresponding values having been encrypted by the user device using the public digital key; and storing the encrypted values for the one or more metadata attributes for use in accessing and aggregating financial data describing the financial account. Other embodiments of this aspect include corresponding systems, apparatus, and computer programs recorded on computer storage devices, each configured to perform the operations of the methods.

These and other embodiments can each optionally include one or more of the following features. The method further includes providing the encrypted values for the one or more metadata attributes to one or more login webpages associated with the financial institution; in response to providing the encrypted values for the one or more metadata attributes to one or more login webpages associated with the financial institution, obtaining access to the financial account associated with the financial institution; obtaining, from the financial institution, financial data describing the financial account; and aggregating the obtained financial data for use in describing the financial account in the interface.

Access to the financial account associated with the financial institution is restricted to read-only access based on the respective values for the one or more metadata attributes being encrypted. The public digital key and a private digital key that corresponds to the public digital key are both generated by the financial institution. Obtaining a public digital key associated with the financial institution comprises obtaining the public digital key from the financial institution. The one or more metadata attributes include a login, password, and one or more multi-factor authentication questions associated with the user device.

The method further includes determining that the public digital key associated with the financial institution has expired; and in response to determining that the public digital key associated with the financial institution has expired, deleting the stored encrypted values for the one or more metadata attributes. The method further includes providing the encrypted values for the one or more metadata attributes to one or more login webpages associated with the financial institution; in response to providing the encrypted values for the one or more metadata attributes to one or more login webpages associated with the financial institution: obtaining access to the financial account associated with the financial institution; and receiving, from the financial institution, an alternative set of credentials for accessing the financial account associated with the financial institution; obtaining, from the financial institution, financial data describing the financial account; and aggregating the obtained financial data for use in describing the financial account in the interface.

Particular embodiments of the subject matter described in this specification can be implemented so as to realize one or more of the following advantages. An aggregation system can be configured to obtain a user's financial data from financial institutions without having to store the user's respective login credentials for the financial institutions in plaintext. Plaintext user login credentials no longer need to be stored on the aggregation system. The aggregation system can access user financial accounts using encrypted user login information. Access to user financial data can be restricted (e.g., read only) by financial institutions when user login information provided to the financial institutions is encrypted. Encrypted user login information for accounts at a particular financial institution can be configured to expire when a public key associated with the particular financial institution expires. The aggregation system can be configured to use other authorization standards and frameworks (e.g., OAuth) to simplify the integration with third-party systems.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
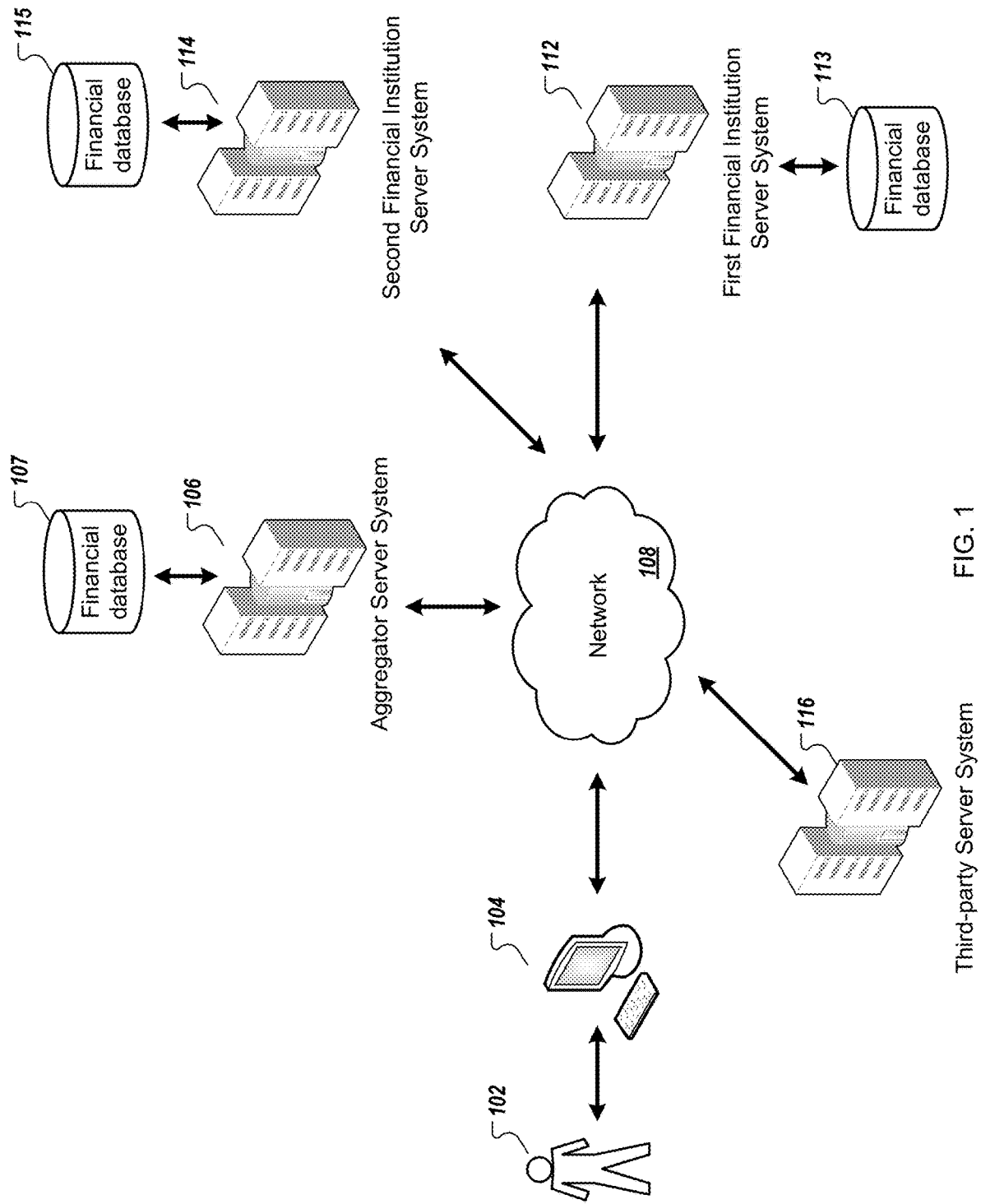
FIG. 1 illustrates an example aggregation system used to aggregate financial data.

FIG. 1 illustrates an example aggregation system used to aggregate financial data. One or more user devices, e.g., the user device 104, an aggregator server system 106, and one or more financial institution server systems, e.g., the systems 112 and 114, are connected through a network 108. Each user device, the aggregator server system 106, and each financial institution server system can include one or more computing devices.

Each financial institution is an institution that provides financial services, deals in financial instruments, or lends, invests, or stores money. Examples of financial institutions include banks, brokerage firms, credit card companies, credit unions, and savings and loans. Each financial institution stores, for example, in a respective database that is associated with its respective server system, financial information about users that have a financial account with the respective financial institution. As shown in FIG. 1, for example, database 113 can communicate with the system 112 and database 115 can communicate with the system 114. The financial information can also be stored in a database, e.g., database 107, in communication with the aggregator server system 106 once a user has requested aggregation of their financial accounts on a financial institution server system, e.g., the system 112 or 114. A user can have an account with the financial institution when, for example, the user deposits money at the institution or has a line of credit provided by the financial institution.

Financial information, or financial data, includes, for example, customer data, account data, financial institution data, payee data, and transaction data. Customer data includes the customer's name and contact information, e.g., the customer's address, telephone number, and email address. Customer data can also include the customer's password or PIN. Account data includes the customer's account numbers, financial institutions, and account balances. The financial institution data includes the financial institution's name and address and the financial institution's ABA or routing number.

Users, e.g., the user 102, with respective accounts with one or more of the financial institutions can use one or more user devices, e.g., the user device 104, to access financial information related to their account with a financial institution. As described below, the users can access this information through an interface provided by the aggregator server system 106 or through an interface provided by a financial institution that includes data provided by the aggregator server system 106 as a backend provider.

Some examples of user devices include computers, tablets, and mobile devices, e.g., cellular phones. A user device can present a user interface through, for example, a computer program that presents data, e.g., text and images, in a format specified by the aggregator server system 106. In some implementations, the user interface is presented in a web browser. The web browser receives one or more webpages from the aggregator server 106 and presents the webpages to the user. Presenting the user interfaces to the user can include displaying the user interfaces on a computer monitor or other display device. Presenting the user interfaces can also include any other method of conveying information to the user, for example presenting sounds corresponding to the user interfaces or providing haptic feedback corresponding to the user interfaces.

The aggregator server system 106 runs applications that provide various services to users, including account aggregation, presentation of financial information, and automatic bill payments. The aggregator server system 106 can provide these services directly to a user either on its own behalf or on behalf of a financial institution. In situations where the aggregator server system 106 provides services directly to a user on behalf of a financial institution, it optionally brands communications it sends to the user's device 104 with the financial institution's logo, colors, or other information so that the user, viewing the communication on the user device 104, is given the impression that the user is interacting with the financial institution server 112 rather than the aggregator server system 106. In brief, the aggregator server system 106 can store data associating financial institutions with graphic images and color codes, e.g., in a database. When the aggregator server system 106 generates a user interface, e.g. a webpage, branded as a financial institution, the server 106 inserts the graphic images and color codes associated with the financial institution into the user interface that is then sent to the user, e.g., into a markup language document corresponding to a webpage.

Alternatively, the aggregator server system 106 can be configured as a backend provider and can provide software, support, and other tools to a financial institution to allow the financial institution to provide some or all these services to a user directly through, for example, the financial institution's website that is hosted on the financial institution's server system, e.g., the system 112. In some implementations, the aggregator server system 106 and a financial institution are the same entity, and the aggregator server system 106 and the financial institution server system 112 are the same system.

As used in this specification, account aggregation involves collecting financial information about a user. Data representing this information is optionally stored in a data repository, e.g., a database, on the aggregator server system 106, or on one or more financial institution server systems, e.g., the systems 112 and 114. Financial information can be collected in different ways. In some implementations, information is received directly from the system 112 or 114. In some implementations, the aggregator server system 106 runs one or more agents to extract user-specific financial information from various webpages and other consumer-accessible channels, for example public Open Financial Exchange (OFX) feeds.

An agent is a computer program that extracts financial information by, for example, screen scraping by parsing the HyperText Markup Language (HTML) code of webpages and identifying relevant information, or by extracting financial information from data feeds. A webpage is a block of data identified by a URL that is available on the Internet. One example of a webpage is a HTML file. Webpages commonly contain content; however, webpages can also refer to content outside the webpage that is presented when the webpage loads in a user's web browser. Webpages can also generate content dynamically based on interactions with the user. A public OFX feed is a stream of financial data sent to another computer, for example, over the Internet, by a server of one or more financial institutions, where the data is formatted in accordance with the Open Financial Exchange standard. Other methods of gathering financial information are also envisioned.

When collecting financial information about a user 102 from a particular financial institution, the aggregator server system 106 typically logs into to the user's account on the financial institution's website using the user's login credentials, e.g., login and password, for the website. The process of how the aggregator server system 106 obtains a user's login credentials can vary depending on whether the aggregator server system 106 provides services directly to a user on its own behalf or on behalf of a financial institution, or as a backend provider.

For example, if the aggregator server system 106 is providing services on behalf of itself or on behalf of a financial institution, a user 102 accessing the aggregator server system 106 using a user device 104 interacts with an interface provided by the aggregator server system 106 to identify a financial institution and to login to the user's account for that financial institution. For example, the interface provided by the aggregator server system 106 can be a financial dashboard that presents financial information for the user's accounts on various financial institutions. The aggregator server system 106 can capture the user's login credentials and store them in a database, e.g., the database 107. The aggregator server system 106 can later use the stored login credentials to access and collect the user's financial information from the financial institution's website. This process can be repeated to configure the aggregator server system 106 to collect data from other financial institutions, e.g., the different financial institution server system 114, with which the user has accounts.

In another example, if the aggregator server system 106 is providing services to a particular financial institution as a backend provider, a user 102 using a user device 104 to access the particular financial institution's server system, e.g., the system 112, interacts with an interface provided by the particular financial institution to identify a different financial institution and to login to the user's account for the different financial institution. For example, the interface provided by the particular financial institution can be a financial dashboard that presents financial information for the user's accounts on various financial institutions. The user can identify a different financial institution, e.g., the system 114, with which the user has a financial account to be included in the financial dashboard.

In response to the user identifying the different financial institution, the interface can provide the user with a login interface for inputting login credentials for the user's account on the different financial institution. Once the user successfully inputs the user's login credentials, the aggregator server system 106 can capture the user's login credentials for the different financial institution and can store the login credentials in a database, e.g., the database 107. The aggregator server system 106 can later use the stored login credentials to access and collect the user's financial information from the different financial institution's website.

In some implementations, financial institution systems, e.g., the systems 112 and 114, implement a public-key infrastructure (PKI) configuration to protect user login information. As used in this specification, user login information can include a user's login credentials, e.g., a username and password, for a financial account in addition to other types of information that may be needed for the user to login. For example, the user login information can also include data for satisfying multi-factor authentication (MFA) requirements that have been implemented by a financial institution (e.g., a mapping of the user's answers to challenge questions).

The systems 112 and 114 each generate a respective pair of public and private digital keys using a conventional algorithm, e.g., RSA. Depending on the implementation, financial institutions systems 112 and 114 can provide their respective public digital keys to the aggregation server system 106 or can make their public digital keys available on a publicly accessible third-party server 116. The aggregation server system 106 can provide the public digital keys to a user device to be used for encrypting the user's respective login information for financial accounts on the respective financial institution server systems 112 and 114. In particular, each user's login information for a particular financial institution server system is encrypted using a public digital key that was generated by that particular financial institution server system.

For example, a particular user may have a first financial account on the first financial institution server system 112 and a second financial account on the second financial institution server system 114. In this situation, the aggregation server system 106 uses the public digital key generated by the first financial institution server system 112 to encrypt the user's login information for the first financial institution server system 112. Similarly, the aggregation server system 106 uses the public digital key generated by the second financial institution server system 114 to encrypt the user's login information for the second financial institution server system 114.

The aggregation server system 106 stores each user's encrypted login information for each financial institution the user has a financial account, for example, in a database 107. The aggregation server system 106 can use the encrypted login information for a particular user to access the particular user's financial accounts on corresponding financial institution server systems, and to aggregate financial data that describes the financial accounts.

In some implementations, when the aggregation server system 106 accesses the particular user's financial account on a financial institution server system (e.g., by providing the particular user's encrypted login information to the financial institution server system), the financial institution server system transmits an alternative set of credentials (e.g., OAuth tokens) for the particular user to the aggregator server system 106. The aggregation server system 106 stores the alternative set of credentials in the database 107, and does not store the user's plaintext login credentials. The aggregation server system 106 can then use the alternative set of credentials for the particular user to access the particular user's financial account on the financial institution server system, and to aggregate financial data that describes the financial account.

Private digital keys that are generated by the financial institution server systems 112 and 114 are kept secret by the respective financial institution server systems 112 and 114, and are not shared. Under the PKI configuration, data that is encrypted using a financial institution server system's public digital key can only be decrypted using that financial institution server system's private digital key.

In some implementations, a user interacting with an interface provided by the aggregator server system 106 can request that the user's financial account with a financial institution 112 be included in an interface, e.g., a financial dashboard. Once the user request is received by the aggregator server system 106, the aggregation server system 106 identifies user login information, e.g., metadata attributes, that are needed for accessing the financial account associated with the financial institution server system 112. For example, the aggregation server system 106 can determine that to access financial accounts on the financial institution server system 112, the system 106 needs a user's username and password. Thus, the aggregation server system 106 can identify a username metadata attribute and a password metadata attribute.

The aggregation server system 106 can identify the metadata attributes by, for example, identifying particular fields in login webpages for the financial institution server system 112 in which a user needs to provide values, e.g., a username, password, or a response to a question. The aggregation server system 106 can identify the particular fields by screen scraping data from the login webpages. That is, the aggregation server system 106 can parse HTML or Extensible Markup Language (XML) code of the login webpages to identify the particular fields for which the user needs to provide values.

After identifying the metadata attributes, the aggregation server system 106 displays data describing the identified metadata attributes on the interface. For example, if the identified metadata attributes include a username and password, then the aggregation server system 106 displays on the interface a first input field for inputting a username and a second input field for inputting a password. The user operating the user device can interact with the interface to provide respective values for these metadata attributes. That is, the user can interact with the interface to input the user's username and password for the financial account associated with the financial institution server system 112. In some implementations, the aggregation server system 106 also provides the user device 104 with a copy of the public digital key for the financial institution server system 112. In some implementations, the user device 104 obtains the public digital key for the financial institution server system 112 from the financial institution server system 112 or a third-party server system 116.

The user device 104 encrypts the respective values, e.g., the user's username and password, for the metadata attributes that were provided by the user using the public digital key for the financial institution server system 112. The user device 104 can encrypt the respective values using conventional asymmetric key algorithms. The user device 104 provides the encrypted values to the aggregation server system 106 for use in accessing the user's financial account for aggregating financial data.

The aggregator server system 106 can store the encrypted values in a database, e.g., the database 107, and can use the encrypted values to provide services, e.g., account aggregation, for the user's account with the financial institution. Notably, the aggregation does not receive or store plaintext values (e.g., plaintext usernames and passwords). When using the encrypted values to access the user's account with the financial institution 114, the aggregator server system 106 interacts with a PKI login interface that is provided by the financial institution 114. In some implementations, the PKI login interface is a PKI login webpage on the financial institution's website 114 that is configured to accept encrypted values, e.g., an encrypted username and password, for the metadata attributes that were identified for the financial institution's website. Depending on the implementation, the PKI login interface can be any interface capable of accepting values encrypted using the financial institution's public digital key for authentication (e.g., a web services interface, data feeds, etc.). In some implementations, the PKI login interface is configured to be accessible through one or more whitelisted networks and/or one or more whitelisted server systems. Additionally, the PKI login interface can be configured to be inaccessible through one or more blacklisted network connections and/or server systems.

In some implementations, the user device 104 encrypts the respective values, e.g., the user's username and password, for the metadata attributes that were provided by the user using a different encryption scheme (e.g., Pretty Good Privacy). In such implementations, the aggregator server system 106 decrypts the encrypted values provided by the user device 104, and re-encrypts the values using the public digital key for the financial institution server system 112. The aggregator server system 106 discards the decrypted (e.g., plaintext) values and stores the values encrypted using the public digital key in a database, e.g., the database 107, and can use the encrypted values to provide services, e.g., account aggregation, for the user's account with the financial institution.

Figure 2:
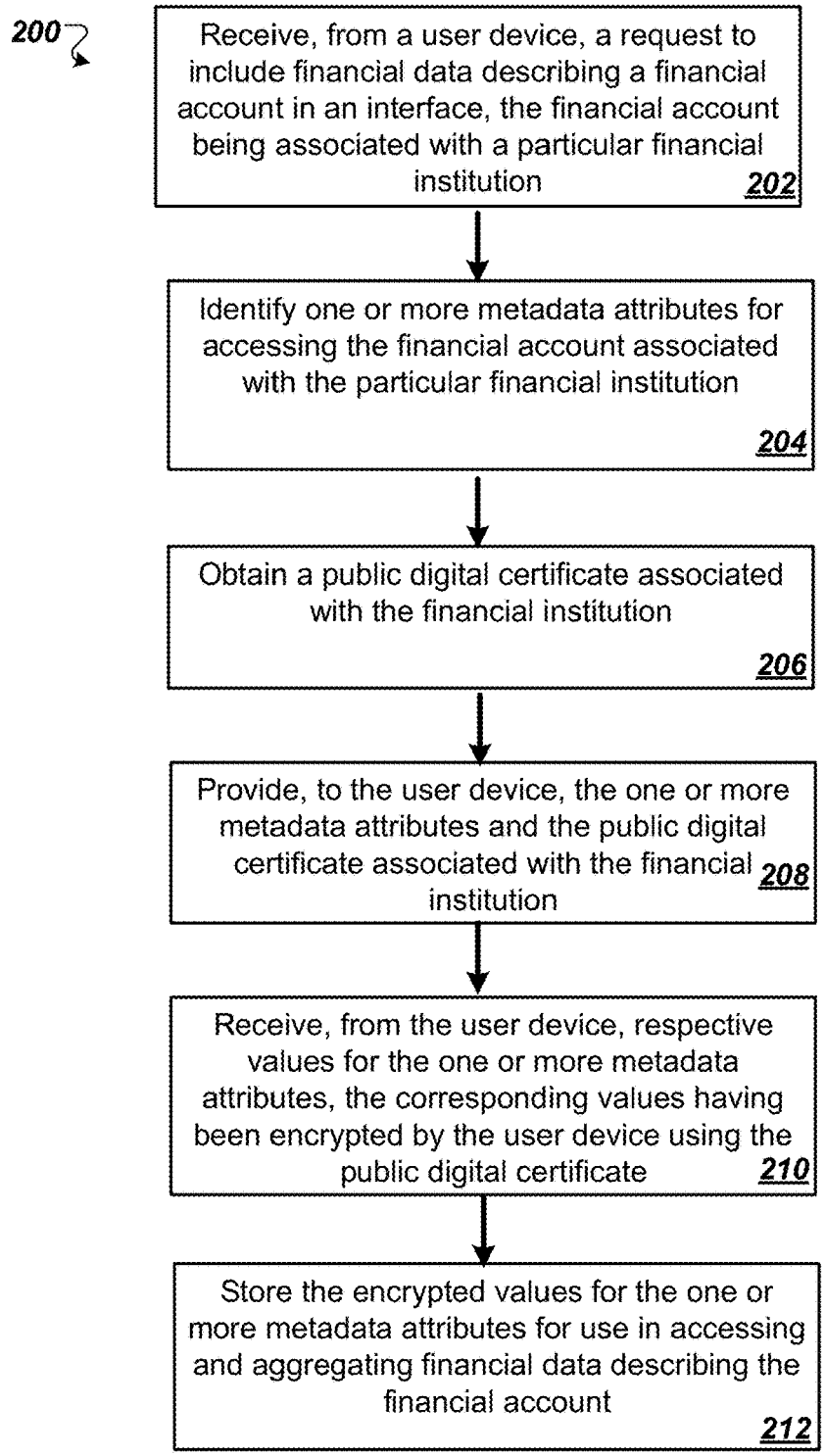
FIG. 2 illustrates an example method for encrypting user login information.

FIG. 2 illustrates an example method 200 for encrypting user login information. For convenience, the example method 200 will be described in reference to a system that performs the method 200. The system can be, for example, the aggregator server system 106.

The system receives, from a user device, a request to include financial data describing a financial account in an interface, the financial account being associated with a particular financial institution (step 202). As described above, the user request can be received, for example, from a user operating a user device that is interacting with the system, e.g., the aggregator server system 106, or with a financial institution server system through a network.

In some implementations, the system communicates, to the user device, a listing of financial institutions. The user operating the user device can select, from the listing of financial institutions, one or more financial institutions with which the user has a financial account. Based on these selections, the system identifies metadata attributes for accessing the respective financial accounts, obtains respective public digital keys for the respective financial institutions associated with the financial accounts, provides data describing the respective metadata attributes and corresponding public digital keys to the user device, receives respective encrypted values for the identified metadata attributes, and stores the encrypted values for accessing and aggregating financial data for the respective financial accounts, as described below. Thus, in such implementations, the user device does not need to communicate a request to include financial data describing a financial account in an interface.

The system identifies one or more metadata attributes for accessing the financial account associated with the particular financial institution (step 204). As described above, the system can identify metadata attributes that are needed for accessing the financial account associated with the particular financial institution by, for example, screen scraping, e.g., parsing the HTML code, of a login webpage associated with the particular financial institution.

The system obtains a public digital key generated by the particular financial institution (step 206). The system can obtain the public digital key that was generated by the particular financial institution from the particular financial institution's server system or through a third-party server system that is configured to store public digital keys.

The system provides, to the user device, data identifying the one or more metadata attributes and the public digital key associated with the particular financial institution (step 208). For example, the user device can display data identifying the metadata attributes on a user interface. The user can interact with the user device to provide respective values for the identified metadata attributes displayed on the user interface. The user device then encrypts the respective values that were provided by the user using the public digital key for the particular financial institution. The user device encrypts and provides the values to the system.

The system receives, from the user device, respective values for the one or more metadata attributes, the corresponding values having been encrypted by the user device using the public digital key (step 210).

The system stores the encrypted values for the one or more metadata attributes for use in accessing and aggregating financial data describing the financial account (step 212).

Figure 3:
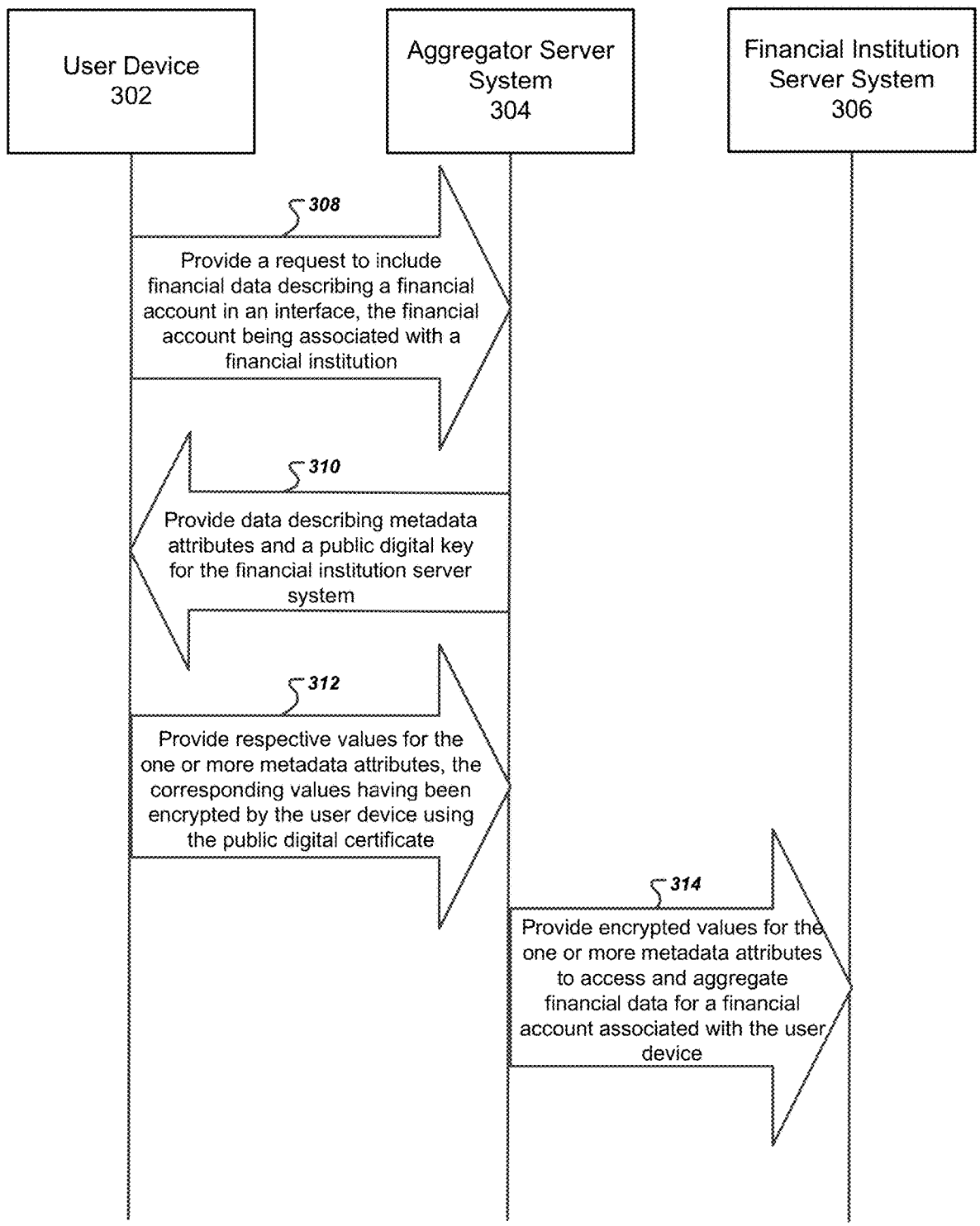
FIG. 3 illustrates an example flow diagram illustrating an example technique for accessing a financial institution server system using encrypted user login information.

FIG. 3 illustrates an example flow diagram 300 illustrating an example technique for accessing a financial institution server system using encrypted user login information.

A user 302 operating a user device provides a request to an aggregator server system 304, e.g., the system 106, to include financial data describing a financial account in an interface provided by the aggregator server system, the financial account being associated with a financial institution 306, e.g., the system 112 (step 308). The user request can be provided from a user device communicating over a network.

The aggregator server system 304 provides data describing metadata attributes and a public digital key for the financial institution server system 306 to the user device 302 (step 310).

The user operating the user device 302 can input in a user interface on the user device 302 respective values for the metadata attributes. The user device 302 encrypts using the public digital key the respective values for the metadata attributes and provides the encrypted values to the aggregator server system 304 (step 312).

The aggregator server system 304 can store the encrypted values for use in aggregating the user's financial data from the financial institution server system 306. When aggregating the user's financial data from the financial institution server system 306, the aggregator server system 304 can authenticate itself to the financial institution server system 306 by providing the financial institution's server system with the encrypted values (step 314). In some implementations, the aggregator server system 304 provides the encrypted values through a PKI login interface that is provided by the financial institution server system 306. The PKI login interface can be a login webpage on the financial institution's website that is configured to accept encrypted values, e.g., an encrypted username and password, for the metadata attributes that were identified for the financial institution server system.

Upon authentication, the aggregator server system 304 can access and obtain financial data from the user's financial account associated with the financial institution server system 306. For example, as described above, the aggregator server system 304 can aggregate financial information that was obtained through screen scraping, e.g., parsing the HTML code, of webpages and identifying relevant information. Additionally, the system can also aggregate financial information that was extracted from data feeds.

Figure 4:
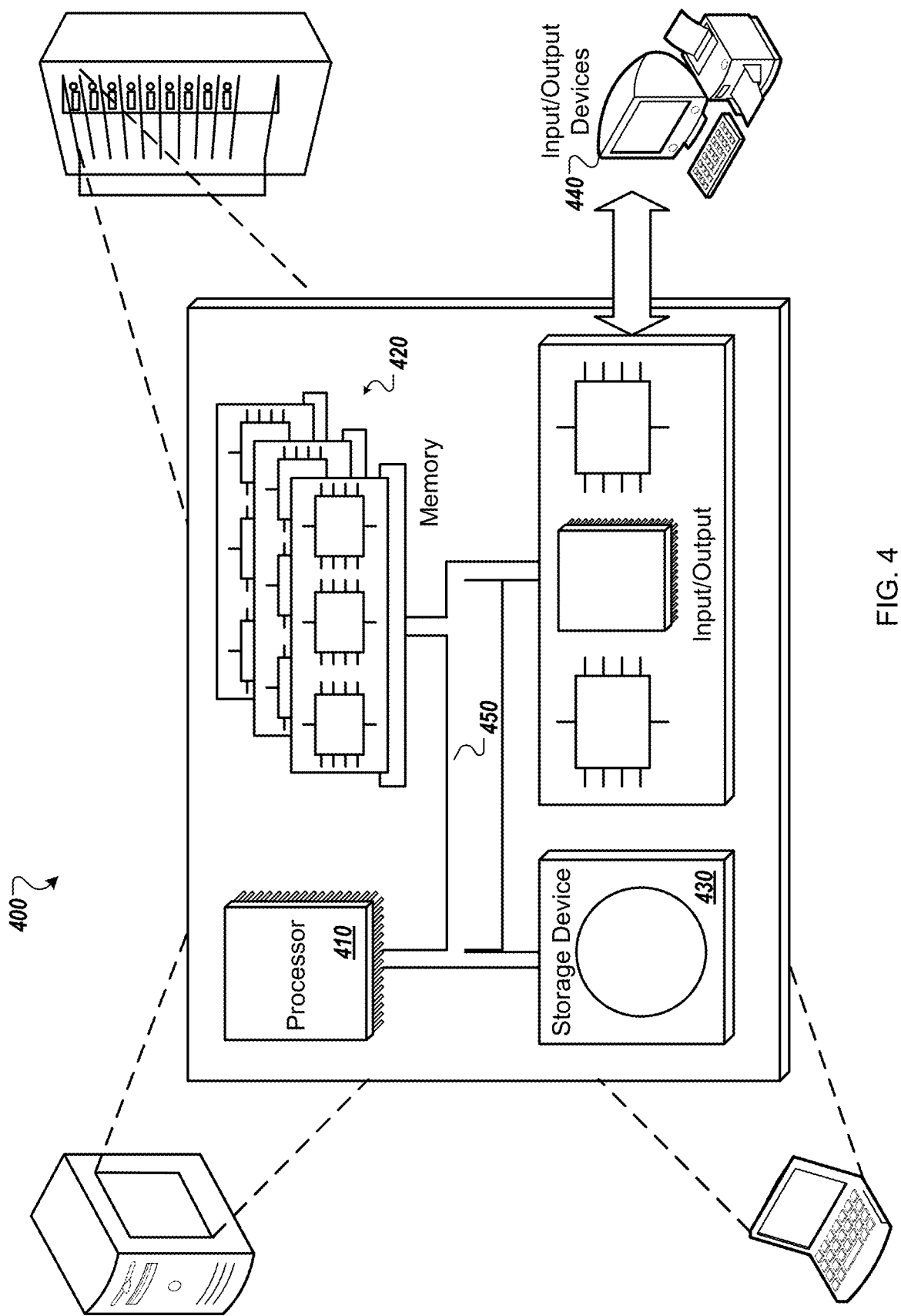
FIG. 4 is a schematic diagram of an example of a generic computer system.

FIG. 4 is a schematic diagram of an example of a generic computer system 400. The system 400 can be used for the operations described above. For example, the system 400 may be included in either or all of the aggregator's server system 106, the financial institution server systems 112 and 114, or the user device 104.

The system 400 includes a processor 410, a memory 420, a storage device 430, and an input/output device 440. Instructions that implement operations associated with the methods described above can be stored in the memory 420 or on the storage device 430. Each of the components 410, 420, 430, and 440 are interconnected using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 may be a floppy disk device, a hard disk device, an optical disk device, or a tape device.

The input/output device 440 provides input/output operations for the system 400. In some implementations, the input/output device 440 includes a keyboard and/or pointing device. In another implementation, the input/output device 440 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. The computer storage medium can be a machine-readable storage device, a machine-readable storage substrate, a random or serial access memory device, or a combination of one or more of them. Alternatively or in addition to being encoded on a storage medium, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    receiving, at an aggregation system and from a user device, a request to include user data describing a user account in an interface, the user account being associated with an account provider;
    identifying one or more metadata attributes for which corresponding values are required to access the user account associated with the account provider;
    receiving a public digital key associated with the account provider;
    transmitting, from the aggregation system and to the user device, data describing the one or more metadata attributes and the public digital key associated with the account provider;
    receiving, at the aggregation system and from the user device, respective encrypted values for the one or more metadata attributes, the encrypted values having been encrypted by the user device using the public digital key;
    storing, by the aggregation system, the encrypted values for the one or more metadata attributes for use in accessing and aggregating the user data describing the user account;
    transmitting, from the aggregation system and to a computer system of the account provider, the encrypted values for the one or more metadata attributes into one or more webpages associated with the account provider, the transmitting causing the computer system of the account provider to authenticate the aggregation system for accessing data corresponding to the user account;
    generating for display in the interface the user data describing the user account;
    determining that the public digital key associated with the account provider has expired; and
    based on determining that the public digital key associated with the account provider has expired, deleting, by the aggregation system, the stored encrypted values for the one or more metadata attributes.

2. The method of claim 1, further comprising:
    in response to transmitting the encrypted values for the one or more metadata attributes to the account provider, receiving access to the user account associated with the account provider;
    receiving, at the aggregation system and from the computer system of the account provider, account data describing the user account; and
    aggregating the account data for use in describing the user account in the interface.

3. The method of claim 2, wherein access to the user account associated with the account provider is restricted to read-only access based on the respective encrypted values for the one or more metadata attributes.

4. The method of claim 1, further comprising, in response to transmitting the encrypted values for the one or more metadata attributes, receiving, at the aggregation system and from the computer system of the account provider, an authentication token for accessing account data of the user account, the authentication token providing alternative credentials other than login credentials for the user account.

5. The method of claim 4, wherein the authentication token is an OAuth token.

6. The method of claim 1, wherein the one or more metadata attributes include one or more of: a login, a password, or one or more multi-factor authentication questions associated with the user device.

7. The method of claim 1, further comprising:
    based on transmitting the encrypted values for the one or more metadata attributes to the computer system of the account provider:
        obtaining access to the user account associated with the account provider; and
        receiving, at the aggregation system and from the computer system of the account provider, an alternative set of credentials for accessing the user account associated with the account provider; and
    receiving, at the aggregation system and from the computer system of the account provider, account data describing the user account.

8. A non-transitory computer storage medium encoded with a computer program, the computer program comprising instructions that when executed by a data processing apparatus cause the data processing apparatus to perform operations comprising:
    receiving, at an aggregation system and from a user device, a request to include user data describing a user account in an interface, the user account being associated with an account provider;
    identifying one or more metadata attributes for which corresponding values are required to access the user account associated with the account provider;
    receiving a public digital key associated with the account provider;
    transmitting, from the aggregation system and to the user device, data describing the one or more metadata attributes and the public digital key associated with the account provider;

receiving, at the aggregation system and from the user device, respective encrypted values for the one or more metadata attributes, the encrypted values having been encrypted by the user device using the public digital key;

storing, by the aggregation system, the encrypted values for the one or more metadata attributes for use in accessing and aggregating the user data describing the user account;

transmitting, from the aggregation system and to a computer system of the account provider, the encrypted values for the one or more metadata attributes into one or more webpages associated with the account provider, the transmitting causing the computer system of the account provider to authenticate the aggregation system for accessing data corresponding to the user account;

generating for display in the interface the user data describing the user account;

determining that the public digital key associated with the account provider has expired; and based on determining that the public digital key associated with the account provider has expired, deleting, by the aggregation system, the stored encrypted values for the one or more metadata attributes.

9. The non-transitory computer storage medium of claim 8, the operations further comprising:

in response to transmitting the encrypted values for the one or more metadata attributes to the account provider, receiving access to the user account associated with the account provider;

receiving, at the aggregation system and from the computer system of the account provider, account data describing the user account; and aggregating the account data for use in describing the user account in the interface.

10. The non-transitory computer storage medium of claim 9, wherein access to the user account associated with the account provider is restricted to read-only access based on the respective encrypted values for the one or more metadata attributes.

11. The non-transitory computer storage medium of claim 8, the operations further comprising, in response to transmitting the encrypted values for the one or more metadata attributes, receiving, at the aggregation system and from the computer system of the account provider, an authentication token for accessing account data of the user account, the authentication token providing alternative credentials other than login credentials for the user account.

12. The non-transitory computer storage medium of claim 11, wherein the authentication token is an OAuth token.

13. The non-transitory computer storage medium of claim 8, wherein the one or more metadata attributes include one or more of: a login, a password, or one or more multi-factor authentication questions associated with the user device.

14. The non-transitory computer storage medium of claim 8, the operations further comprising:

based on transmitting the encrypted values for the one or more metadata attributes to the computer system of the account provider:

obtaining access to the user account associated with the account provider; and receiving, at the aggregation system and from the computer system of the account provider, an alternative set of credentials for accessing the user account associated with the account provider; and receiving, at the aggregation system and from the computer system of the account provider, account data describing the user account.

15. A system comprising electronic circuitry configured to perform operations comprising:

receiving, at an aggregation system and from a user device, a request to include user data describing a user account in an interface, the user account being associated with an account provider;

identifying one or more metadata attributes for which corresponding values are required to access the user account associated with the account provider;

receiving a public digital key associated with the account provider;

transmitting, from the aggregation system and to the user device, data describing the one or more metadata attributes and the public digital key associated with the account provider;

receiving, at the aggregation system and from the user device, respective encrypted values for the one or more metadata attributes, the encrypted values having been encrypted by the user device using the public digital key;

storing, by the aggregation system, the encrypted values for the one or more metadata attributes for use in accessing and aggregating the user data describing the user account;

transmitting, from the aggregation system and to a computer system of the account provider, the encrypted values for the one or more metadata attributes into one or more webpages associated with the account provider, the transmitting causing the computer system of the account provider to authenticate the aggregation system for accessing data corresponding to the user account;

generating for display in the interface the user data describing the user account;

determining that the public digital key associated with the account provider has expired; and based on determining that the public digital key associated with the account provider has expired, deleting, by the aggregation system, the stored encrypted values for the one or more metadata attributes.

16. The system of claim 15, the operations further comprising:

in response to transmitting the encrypted values for the one or more metadata attributes to the account provider, receiving access to the user account associated with the account provider;

receiving, at the aggregation system and from the computer system of the account provider, account data describing the user account; and aggregating the account data for use in describing the user account in the interface.

17. The system of claim 16, wherein access to the user account associated with the account provider is restricted to read-only access based on the respective encrypted values for the one or more metadata attributes.

18. The system of claim 15, the operations further comprising, in response to transmitting the encrypted values for the one or more metadata attributes, receiving, at the aggregation system and from the computer system of the account provider, an authentication token for accessing account data of the user account, the authentication token providing alternative credentials other than login credentials for the user account.

19. The system of claim 18, wherein the authentication token is an OAuth token.

20. The system of claim 15, wherein the one or more metadata attributes include one or more of: a login, a password, or one or more multi-factor authentication questions associated with the user device.

\* \* \* \* \*